(12) United States Patent  
Im

(10) Patent No.: US 10,908,701 B2
(45) Date of Patent: Feb. 2, 2021

(54) ELECTRONIC DEVICE AND METHOD FOR CAPTURING MULTIMEDIA CONTENT

(71) Applicant: Samsung Electronics Co., Ltd., Gyeonggi-do (KR)

(72) Inventor: Sojeong Im, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/575,677

(22) Filed: Sep. 19, 2019

(65) Prior Publication Data

US 2020/0097097 A1   Mar. 26, 2020

(30) Foreign Application Priority Data

Sep. 21, 2018   (KR) ..................... 10-2018-0114057

(51) Int. Cl.
*G06F 3/041* (2006.01)
*G06F 3/023* (2006.01)
*G06F 3/0484* (2013.01)
*G06F 3/0487* (2013.01)

(52) U.S. Cl.
CPC ............ *G06F 3/023* (2013.01); *G06F 3/0487* (2013.01); *G06F 3/04842* (2013.01)

(58) Field of Classification Search
None
See application file for complete search history.

(56) References Cited

U.S. PATENT DOCUMENTS

| 2007/0091194 A1 | 4/2007 | Kwak |
| 2012/0044137 A1 | 2/2012 | Oddiraju et al. |
| 2012/0162084 A1 | 6/2012 | Lee |
| 2013/0143620 A1* | 6/2013 | Seo .................... H04M 1/72522 455/556.1 |
| 2016/0021296 A1 | 1/2016 | Mikami et al. |
| 2018/0089149 A1 | 3/2018 | He et al. |
| 2018/0129657 A1* | 5/2018 | Guest .................. G06F 3/04842 |
| 2020/0042148 A1* | 2/2020 | Huang ................ G06F 3/04845 |

FOREIGN PATENT DOCUMENTS

| KR | 10-2007-0010598 A | 1/2007 |
| KR | 10-2014-0101616 A | 8/2014 |
| KR | 10-1525025 B1 | 6/2015 |
| WO | 2015/132767 A1 | 9/2015 |

OTHER PUBLICATIONS

Zac Hall, iPhone 11 camera lets you capture video without pausing your music, Sep. 25, 2019, 9TO5MAC (Year: 2019).*
International Search Report dated Jan. 9, 2020.

* cited by examiner

*Primary Examiner* — Joseph R Haley
(74) *Attorney, Agent, or Firm* — Cha & Reiter, LLC.

(57) ABSTRACT

An electronic device and method are disclosed herein. The electronic device includes a housing, a plurality of physical keys arranged on the housing, a memory and a processor. The processor implements the method, including receiving an input generated by activation of two or more of a plurality of physical keys, identifying an operation state of the electronic device based on reception of the input, when the input is received in a first state in which a screen is displayed, executing a first operation related to the displayed screen in response to the received input, and when the input is received in a second state in which an application is processing audio/video (A/V) data, executing a second operation of initiating recording of the A/V data using a memory in response to the received input.

20 Claims, 14 Drawing Sheets

ELECTRONIC DEVICE AND METHOD FOR CAPTURING MULTIMEDIA CONTENT

CROSS-REFERENCE TO RELATED APPLICATION(S)

This application is based on and claims priority under 35 U.S.C. § 119 to Korean Patent Application No. 10-2018-0114057, filed on Sep. 21, 2018, in the Korean Intellectual Property Office, the disclosure of which is herein incorporated by reference in its entirety.

BACKGROUND

Technical Field

The disclosure according to certain embodiments relates to an electronic device and a method related to multimedia, and, more particularly, to capture of multimedia content.

Description of Related Art

An electronic device may provide a user interface through a display. The user may obtain an image, such as, for example, obtain a captured "screen shot" image which may include the user interface, by generate inputs using one or more of a plurality of physical keys of the electronic device. By obtaining the image including the user interface, images displayed in real-time may be converted into storable snapshots of display information.

SUMMARY

An electronic device may include a multi-tasking environment for executing a plurality of applications. In the multi-tasking environment, the electronic device may provide a user interface of an application ongoing in the foreground through a display, and may provide a function of an application ongoing in the background. As electronic devices supporting the multi-tasking are increasingly used, not only a function of obtaining an image of a user interface of an application ongoing in the foreground, but also a function of capturing an application ongoing in the background may be utilized. Accordingly, a solution for capturing an application ongoing in the background may be utilized.

An electronic device according to certain embodiments includes: a housing including a first plate facing in a first direction, a second plate facing in a direction opposite to the first plate, and a side surface member surrounding a space defined between the first plate and the second plate, a display exposed through a first portion of the first plate, a plurality of physical keys arranged on the housing, a processor disposed inside the housing and operatively connected to the display and the plurality of physical keys, and a memory operatively connected with the processor, wherein the memory stores instructions executable by the processor to cause the electronic device to: receive an input generated by activation of two or more of the plurality of physical keys, identify an operation state of the electronic device based on reception of the input, when the input is received in a first state in which a screen is displayed on the display, execute a first operation related to the displayed screen in response to the received input, and when the input is received in a second state in which an application is processing audio/video (A/V) data, execute a second operation initiating recording of the A/V data using the memory in response to the received input.

An electronic device according to certain embodiments includes: a housing including a first plate facing in a first direction, a second plate facing in a direction opposite to the first plate, and a side surface member surrounding a space between the first plate and the second plate, at least one memory disposed inside the housing to store instructions, a display exposed through a part of the first plate, and at least one processor disposed inside the housing and operatively connected with the memory and the display, wherein the memory stores instructions executable by the processor to cause the electronic device to: execute a first application as a foreground process and to execute a second application as a background process, receive an input for capturing at least part of a user interface (UI) of the first application, and in response to receiving the input, capture an image of at least part of the UI of the first application, and capture a recording of at least part of a multimedia content provided by the second application executed as a background process.

An operating method of an electronic device according to certain embodiments includes: receiving an input generated by activation of two or more of a plurality of physical keys, identifying an operation state of the electronic device based on reception of the input, when the input is received in a first state in which a screen is displayed, executing a first operation related to the displayed screen in response to the received input, and when the input is received in a second state in which an application is processing audio/video (A/V) data, executing a second operation of initiating recording of the A/V data using a memory in response to the received input.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
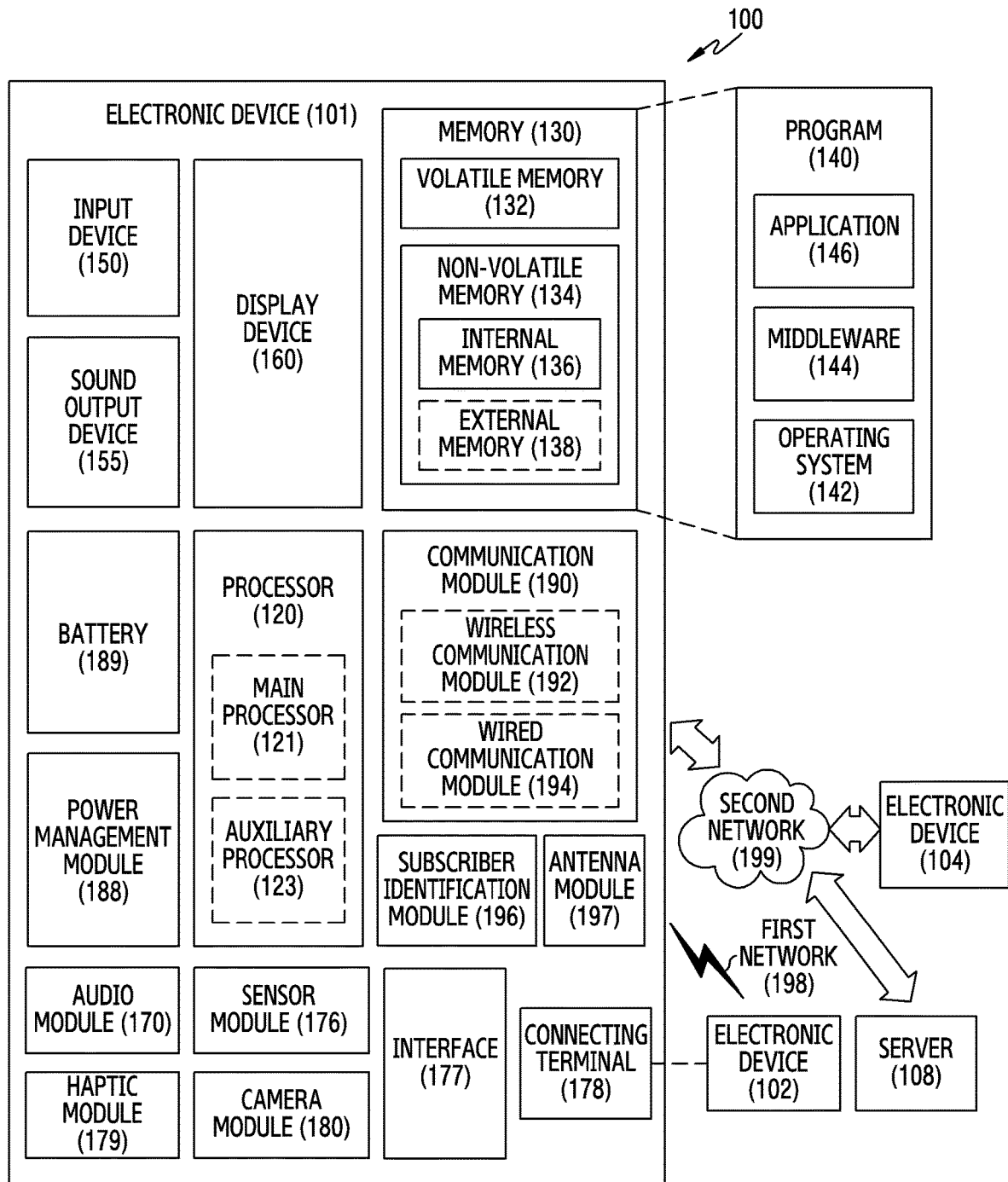
FIG. 1 is a block diagram of an electronic device in a network environment according to certain embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
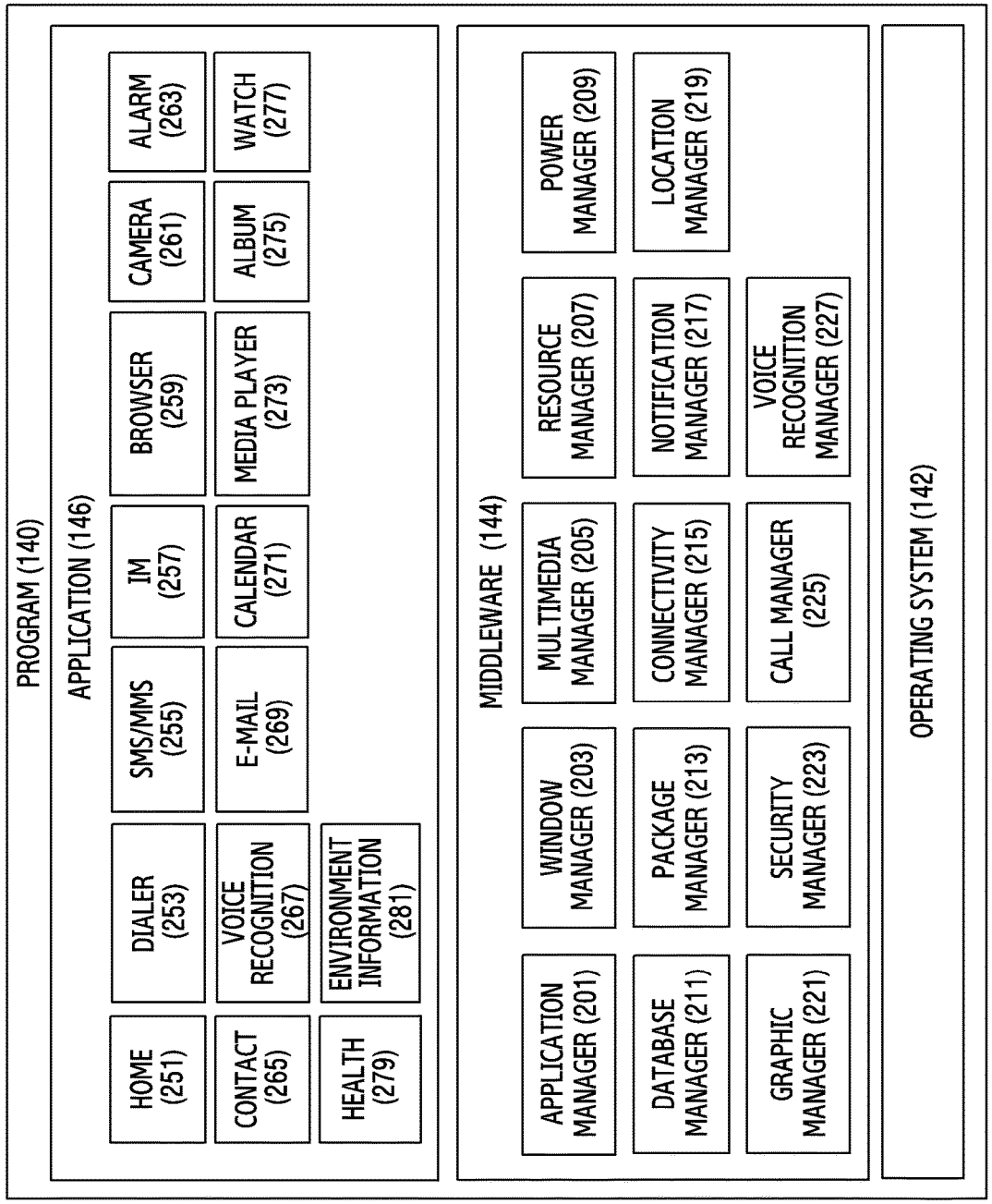
FIG. 2 is a block diagram illustrating a program according to certain embodiments of the disclosure.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
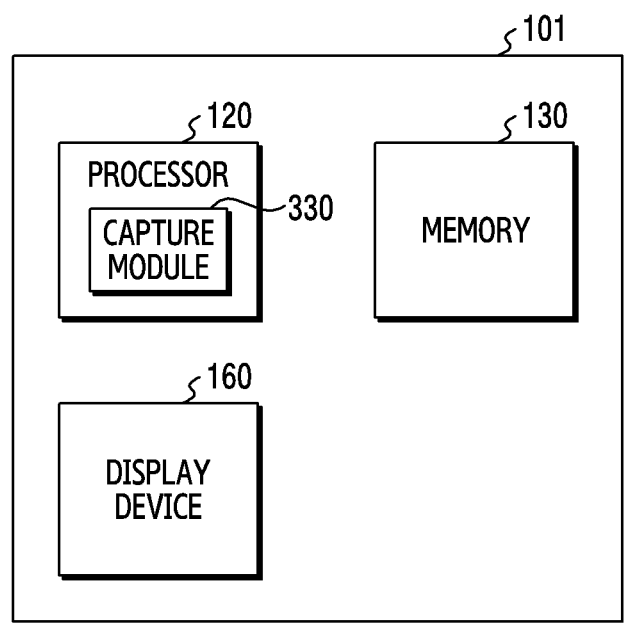
FIG. 3 is a block diagram illustrating a functional configuration of an electronic device according to certain embodiments of the disclosure.

FIG. 3 is a block diagram illustrating a functional configuration of an electronic device according to certain embodiments of the disclosure.

Referring to FIG. 3, the electronic device 101 according to certain embodiments may include a memory 130, a processor 120, and a display device 160. In an embodiment, the processor 120 may include a capture module 330.

The electronic device 101 according to certain embodiments may capture based on a user input. The user input may include a pre-designated input. For example, the pre-designated input may correspond to a combination of a plurality of physical (or hardware) keys (not shown). The plurality of physical keys may include buttons which are exposed through at least part of a housing (not shown) of the electronic device 101. The buttons may include a volume down button, a volume up button, a home button, and/or a power button. The combination of the plurality of physical keys may include, for example, a combination of the volume down button and the power button. In another example, the pre-designated input may include an input according to a combination of a physical key and a soft key. The soft key may indicate a graphical object displayed through the display device 160. The soft key may be configured to provide functions of the buttons. For example, an input according to a combination of the physical key and the soft key may include a combination of the physical key of the power button and a soft home key configured to provide the same function as the home button.

The memory 130 may store instructions for controlling the electronic device 101, a control instruction code, control information, or user data. For example, the memory 130 may include an application, an operating system (OS), middleware, and/or a device driver. According to an embodiment, the memory 130 may store a process which is configured to be performed in response to an input on the plurality of physical keys being received in the form of instructions. For example, when the plurality of key inputs are received, the memory 130 may store instructions to instruct to capture to obtain image data, audio data, or video data.

According to an embodiment, the memory 130 may include one or more of a volatile memory 132 or a nonvolatile memory 134. The volatile memory 132 may include at least a dynamic random access memory (DRAM), a static RAM (SRAM), a synchronous DRAM (SDRAM), a phase-change RAM (PRAM), a magnetic RAM (MRAM), a resistive RAM (RRAM), or a ferroelectric RAM (FeRAM). The nonvolatile memory 134 may include at least a read only memory (ROM), a programmable ROM (PROM), an electrically programmable ROM (EPROM), an electrically erasable ROM (EEPROM), a flash memory. According to an embodiment, the memory 130 may include a nonvolatile medium such as a hard disk driver (HDD), a solid state disk (SSD), an embedded multimedia card (eMMC), or a universal flash storage (UFS).

According to other embodiments, the memory 130 may temporarily store data received from the capture module 330. For example, the memory 130 may receive image data from the capture module 330. The image data may correspond to a still image regarding an image displayed through the display device 160. The image displayed through the display device 160 may correspond to a user interface (UI) of an application which is executed in the foreground. The application executed in the foreground may indicate an application that is displayed through the display device 160 among a plurality of applications executed by the processor 120, and thus is interactable with a user.

In another example, the memory 130 may receive multimedia data from the capture module 330. The multimedia data may include audio data and/or video data. The audio data or video data may include at least part of data processed by an application executed in the foreground or background. The application executed in the background may indicate applications that are not displayed through the display device 160 among the plurality of applications executed by the processor 120, and cannot interact with the user of the electronic device 101. In addition, the applications executed in the background may provide functions without interacting with the user of the electronic device 101. For example, when a music replay application is executed in the background, the music replay application may not be displayed through the display device 160 and cannot interact with the user of the electronic device 101 by receiving a touch input. However, the music replay application may be executed by the processor 120 while not being displayed through the display device 160, thereby providing a function of playing music. According to certain embodiments, the memory 130 may receive the image data and the multimedia data from the capture module 330. For example, while the electronic device 101 executes an application related to the video data or the audio data in the foreground, the electronic device 101 may receive an input instructing to capture. The memory 130 may receive multimedia data regarding audio data or video data which is processed by the application operating in the foreground from the capture module 330, and simultaneously, may receive image data displayed on the screen through the user interface.

The display device 160 may display a user interface of an application. For example, the application may correspond to an application executed in the foreground. The display device 160 may provide visual notification or recognition to the user of the electronic device 101 by providing the user interface configured as a graphical object.

The processor 120 may control overall operations of the electronic device 101. The processor 120 may be operatively connected with other components in the electronic device 101, such as the memory 130, the display device 160, a communication module (for example, the communication module 190 of FIG. 1), to control overall operations of the electronic device 101.

In certain embodiments, the processor 120 may include one processor core or a plurality of processor corers. The processor 120 may include a multi-core such as a dual core, a quad core, or a hexa-core. According to an embodiment, the processor 120 may further include a cache memory positioned inside or outside the processor 120.

In certain embodiments, the processor 120 may receive commands of other components of an external electronic device (for example, the electronic device 102 or the electronic device 104 of FIG. 1), may interpret a received command, and may compute or process data according to the interpreted command. The processor 120 may process data or signal caused in the external electronic device (for example, the electronic device 102 or the electronic device 104 of FIG. 1). For example, the processor 120 may request an instruction, data, or a signal from the memory 130. The processor 120 may record (or store) or refine a command, data, or a signal in the memory 130 to control the electronic device 101 or to control other components in the external electronic device (for example, the electronic device 102 or the electronic device 104 of FIG. 1). The processor 120 may interpret and process a message, data, an instruction, or a signal received from the memory 130, the communication module (not shown), or the display device 160. The processor 120 may generate a new message, data, instruction, or signal based on the received message, data, instruction, or signal. The processor 120 may provide the processed or generated message, data, instruction, or signal to the memory 130 or the communication module (for example, the communication module 190 of FIG. 1).

In certain embodiments, the processor 120 may further include the capture module 330. The capture module 330 may generate data including an image displayed through the display device 160 at a time when a user input is received. The user input may include an input for capturing. The capture module 330 may be enabled in response to the user input being received. The user input may be determined by a combination of at least one physical key and soft key. The user input may be pre-determined and may be changed by the user of the electronic device 101. The capture module 330 may generate multimedia data including at least part of audio data or video data. The audio data or video data may indicate data processed by an application ongoing in the foreground or background. The capture module 330 may generate audio data or video data corresponding to a period from the time when the user input is received to a time when another user input distinct from the user input is received. Another user input may include an input for selecting one of the audio data or video data obtained based on the application ongoing in the foreground or the background, and an image obtained based on an application ongoing in the foreground. According to an embodiment, the capture module 330 may be stored in the memory 130. For example, the capture module 330 may be stored in the memory 130 in the form of an application or instructions.

In certain embodiments, the processor 120 may obtain information regarding a plurality of executed applications. For example, the obtained information may include information of application names regarding the plurality of applications. According to certain embodiments, the obtained information is not limited to the application names. The obtained information may include a variety of information based on an application. For example, when a social network service (SNS) application (for example, Facebook™, Twitter™, or Instagram™) is executed, the obtained information may include information regarding a plurality of users registered at the SNS account as friends. In another example, when a navigation application is executed, the obtained information may include information regarding a destination address inputted on the navigation application, a plurality of landmarks included in a route to the destination. According to certain embodiments, the plurality of applications executed in the foreground or the background may deliver the obtained information to the processor 120. For example, the plurality of applications may store the obtained information in a public storage space accessible by the processor 120. The processor 120 may identify the plurality of applications executed in the foreground or the background, and may obtain information from the plurality of applications by referring to the public storage space.

Figure 4:
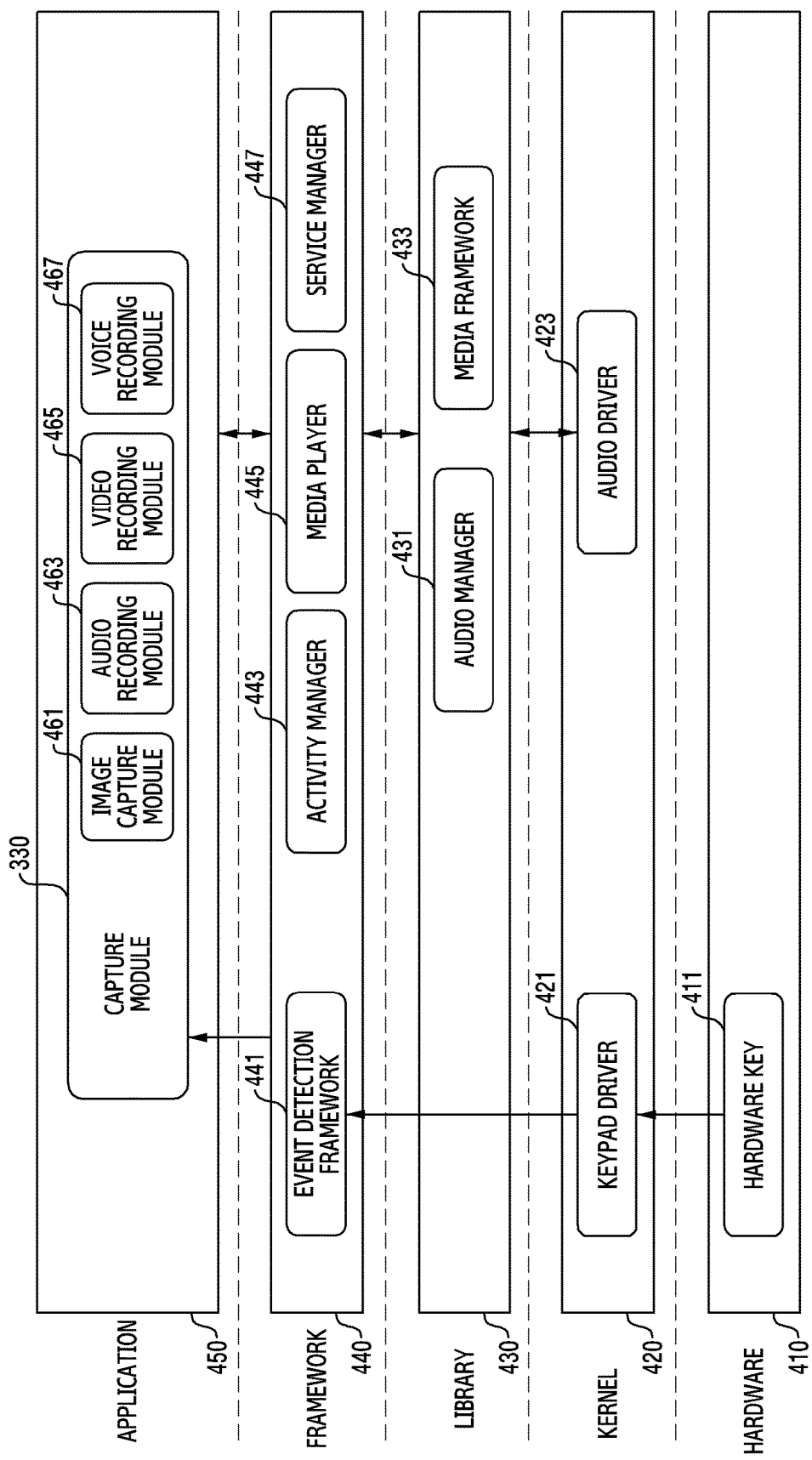
FIG. 4 is a view illustrating a hierarchical structure of the electronic device according to certain embodiments of the disclosure.

FIG. 4 is a view illustrating a hierarchical structure of the electronic device according to certain embodiments of the disclosure.

Referring to FIG. 4, the electronic device 101 may include a hardware layer 410, a kernel layer 420, a library layer 430, a framework layer 440, and an application layer 450.

The hardware layer 410 may process an electric or physical signal of a system. According to an embodiment, the hardware layer 410 may include a plurality of button keys. The plurality of buttons keys may be electrically or operatively connected with the processor 120. The plurality of button keys may be externally exposed through at least part of the housing (not shown) of the electronic device 101. When the plurality of button keys are pressed by the user of the electronic device 101, a control signal may be transmitted to a keypad driver 421 of the kernel layer 420 which is an upper layer.

The kernel layer 420 may provide an interface between a lower layer (for example, the hardware layer 410) and an upper layer (for example, the library layer 430 to the application layer 450). The kernel layer 420 may manage hardware resources such as a buffer memory capacity, and may implement multi-process through scheduling of the processes.

According to certain embodiments, the kernel layer 420 may include a device driver to process input and output with a plurality of hardware devices. The device driver may include the keypad driver 421 and an audio driver 423. The keypad driver 421 may correspond to a device driver for controlling the plurality of button keys. The audio driver 423 may correspond to a device driver for controlling input and output of an audio signal. For example, the audio driver 423 may convert a physical signal regarding an external environment that is received through a microphone to be processed by upper layers.

The library layer 430 may include a specific code (function or class). The specific code may be stored in the form of a complied file. The library layer 430 may include an audio manager 431 and a media framework 433. The audio manager 431 may control all audio input and output processed in the electronic device 101. The media framework 433 may include an audio codec and a video codec to generate a sound through interaction with the hardware 410 or to reproduce an image on the display.

The framework layer 440 may include an event detection framework 441, an activity manager 443, a media player 445, and a surface manager 447.

According to an embodiment, the event detection framework 441 may detect a capture event. The event detection framework 441 may identify that a user input instructing to capture is received, by receiving a control signal from the keypad driver 421 of the kernel layer 420.

The activity manager 443 may adjust execution and termination of a plurality of applications executed by the processor 120. The media player 445 may replay a video by processing video data. The surface manager 447 may control access to a display system, and may display two-dimensionally or three-dimensionally.

The application layer 450 may include the capture module 330. The capture module 330 may include a plurality of subordinate modules. For example, the capture module 330 may include an image capture module 461, an audio recording module 463, a video recording module 465, and/or a voice recording module 467.

The image capture module 461 may capture an image. The image capture module 461 may capture a user interface of an application ongoing in the foreground. The user interface may be displayed through the display device 160.

According to an embodiment, the image capture module 461 may transmit a control signal to the video recording module 465, based on the application ongoing in the foreground. For example, when the application ongoing in the foreground is a video replay application, the image capture module 461 may capture a still image of a video which is replayed through the display device 160 at a time when an input related to a combination of the plurality of physical keys is received in response to the input being received. The image capture module 461 may identify that the application ongoing in the foreground is the video replay application, and may transmit a control signal instructing to perform video recording to the video recording module 465, based on the identification.

According to another embodiment, when the application ongoing in the foreground is a web browser application, the image capture module 461 may capture a web content displayed through the display device 160 at the time when the user input is received. The image capture module 461 may identify that the application ongoing in the foreground is different from the video replay application, and may not transmit a control signal to the video recording module 465. This is because, when the application ongoing in the foreground is the video replay application, not only a still image at the time when the user input for capturing is received, but also video data of a pre-designated period may be requested. The image capture module 461 may receive the user input and may request rendering information from the identified video replay application. The rendering information may include data that is transmitted to the display device 160 from the video replay application to display a content on the display device 160. The image capture module 461 may receive the rendering information from the video replay application, and may obtain the still image based on the rendering information corresponding to the time when the user input is received.

The audio recording module 463 may obtain at least part of audio data which is replayed in the electronic device 101. According to an embodiment, the audio recording module 463 may be enabled based on identification of an application related to audio data among applications executed by the processor 120. For example, the audio recording module 463 may be enabled when a music replay application (for example, a music player, Melon™, or Bugs Music™) is ongoing in the foreground or background. In another example, when a phone call application is ongoing in the foreground or background, the audio recording module 463 may be enabled. The audio recording module 463 may generate audio data including at least part of data processed by the application related to the audio data. For example, when the music replay application is ongoing in the background, the audio recording module 463 may store audio data from the time when the user input for capturing is received to a time when music replayed at the time of receiving the user input finishes. In another example, when the music replay application is ongoing in the background, the audio recording module 463 may store audio data which is processed during a period from the time when the user input for capturing is received to a time when a user input for requesting to stop the audio recording is received. In still another example, when the application executed in the background is the phone call application, the audio recording module 463 may store audio data from the time when the user input for capturing is received to a time when the phone call application is terminated. In yet another example, when the phone call application is ongoing in the background, the audio recording module 463 may store audio data from the time when the user input for capturing is received to a time when the user input for requesting to stop the audio recording is received, even before the phone call application is terminated.

The video recording module 465 may obtain at least part of video data which is replayed by the electronic device 101. According to an embodiment, the video recording module 465 may be enabled by the image capture module 461. For example, when the video replay application is executed in the foreground, the electronic device 101 may receive the user input instructing to capture. The processor 120 may transmit control information for enabling the image capture module 461 and the video recording module 465, based on the user input instructing to capture. The user of the electronic device 101 may want not only a still image at the time when the user input instructing to capture is received, but also video data which is obtained by performing video recording from the time when the user input instructing to capture is received.

The voice recording module 467 may generate audio data regarding a surrounding sound. According to an embodiment, the voice recording module 467 may be enabled based on an operation state of the electronic device. The operation state of the electronic device 101 may be determined, based on information regarding a screen lock of the electronic device 101 and information regarding applications executed by the processor 120. For example, when the electronic device 101 corresponds to the screen lock state, the electronic device 101 may receive the user input instructing to capture. When the electronic device 101 corresponds to the screen lock state at the time that the user input instructing to capture is received, the electronic device 101 may enable the voice recording module 467. According to an embodiment, when the electronic device 101 corresponds to the screen lock state, the electronic device 101 may identify an application operating in a second state in response to a combination of the plurality of physical keys being received, and may enable a microphone in response to the application operating in the second state not being identified, and may perform voice recording by using the enabled microphone.

Figure 5:
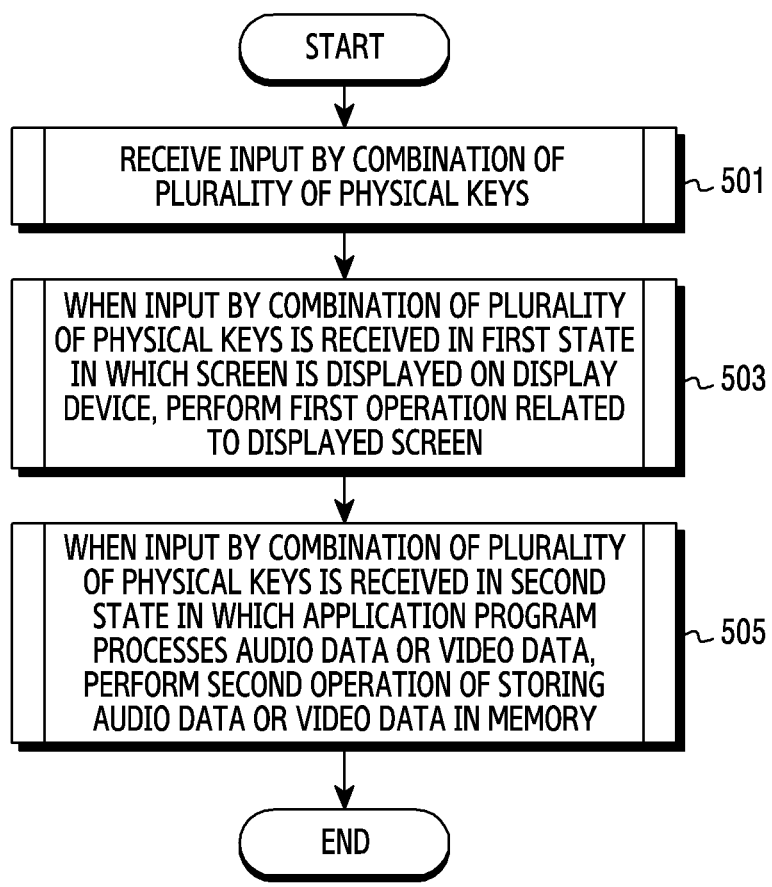
FIG. 5 is a flowchart for capturing in the electronic device according to certain embodiments of the disclosure.

FIG. 5 is a flowchart for capturing in the electronic device according to certain embodiments of the disclosure.

Referring to FIG. 5, the processor 120 of the electronic device 101 may receive an input including a combination of activations for a plurality of physical keys in operation 501. According to an embodiment, the combination of the plurality of physical keys may be pre-determined. The combination of the plurality of physical keys may be pre-configured by a business operator (or a service provider) or a manufacturer of the device as a system command (or instruction). For example, the combination of the plurality of physical keys may correspond to a combination of a volume down key and a power key. In another example, the combination of the plurality of physical keys may be set by the user of the electronic device 101. The user of the electronic device 101 may change the combination of the plurality of physical keys for capturing. The combination of the plurality of physical keys may correspond to a combination of the volume up key and the power key or a combination of the volume down key and the home key. The processor 120 may receive the predetermined combination of the plurality of physical keys, and may transmit a control signal for enabling the capture module 330 to the capture module 330.

In operation 503, when the input by the combination of the plurality of button keys is received in a first state in which a screen is displayed on the display device 160, the processor 120 may perform a first operation related to the displayed screen. The screen displayed on the display device 160 in the first state may include a user interface of an application. The application may correspond to an application ongoing in the foreground. The first operation related to the displayed screen may include an operation of generating an image of a still image including the screen displayed on the display device 160. The processor 120 may request rendering information from the display device 160 or the application to obtain the image of the still image. The application receiving the request for the rendering information may correspond to an application ongoing in the foreground. The rendering information may indicate information that is utilized for the display device 160 to display a graphical object. For example, the processor 120 may request and obtain the rendering information for generating the image of the still image form a driving circuit of the display device 160. In another example, the processor 120 may request and obtain the rendering information for generating the image of the still image from the application. The processor 120 may obtain the image including the still image of the image displayed on the display device 160, based on the obtained rendering information.

In operation 505, when the input by the combination of the plurality of button keys is received in a second state in which an application is processing multimedia audio/video data, the processor 120 may perform a second operation of storing audio/video data in the memory 130. The application may include an application related to multimedia data including audio data or video data. For example, the application may include a phone call application, a music replay application, or a video replay application. The second state may indicate a state in which the application is executed. The second state may correspond to a background state. The background state may indicate a state that is not displayed through the display device 160 and there is no interaction with the user. The background state may indicate a state in which an application is executed by the processor 120 although the application is not displayed through the display device 160. For example, when the application corresponds to the music replay application, the display device 160 may display another application (for example, a web browser) different from the music replay application. The music replay application may perform a function of outputting a sound through a speaker or transmitting audio data to an ear phone wiredly or wirelessly connected, although the music replay application is not displayed on the display device 160.

The display device 160 according to certain embodiments may display not only an application operating in the foreground state, but also information related to another application operating in the background state. According to an embodiment, the display device 160 may display information regarding another application operating in the background state through an indicator area (not shown). The indicator area may refer to an area that is still displayed independently from or regardless of conversion of a content (or screen) displayed on the remaining area of the full display area of the display device 160. For example, the indicator area may include at least an object for indicating an antenna gain of cellular communication, an object for indicating whether a Wi-Fi function is enabled, and/or an object for indicating a remaining capacity of a battery of the electronic device 101. The information regarding another application operating in the background state may include at least an application name of another application, a graphical object of a shortcut icon for executing another application. The user of the electronic device 101 may recognize that another application is operating in the background state through the graphical object of the shortcut icon for executing another application that is displayed on the indicator area.

According to certain embodiments, the display device 160 may display a pop-up window including at least part of a screen and overlapping the screen displayed through the display device 160. The pop-up window may be referred to as a control box. The display device 160 may display the information regarding another application operating in the background through the pop-up window. For example, when the music replay application operates in the background, the display device 160 may display at least one of a title of a song currently replayed, an artist name, an album title, an album image, and/or at least one object (for example, Rewind, Forward, Pause) for controlling replay.

According to an embodiment, audio/video data stored in the memory 130 may include at least part of audio/video data processed by the application. For example, audio data stored in the memory 130 may be audio data corresponding to a certain section of a music file reproduced through the music replay application. The certain section may be determined based on a user input or termination of audio data processed in the application. For example, the certain section may indicate a section from the time when the input by the combination of the plurality of button keys is received to a time when the music file is terminated. In another example, the certain section may indicate a section from the time when the user input for capturing is received to a time when a user input instructing to stop audio recording is received.

Figure 6:
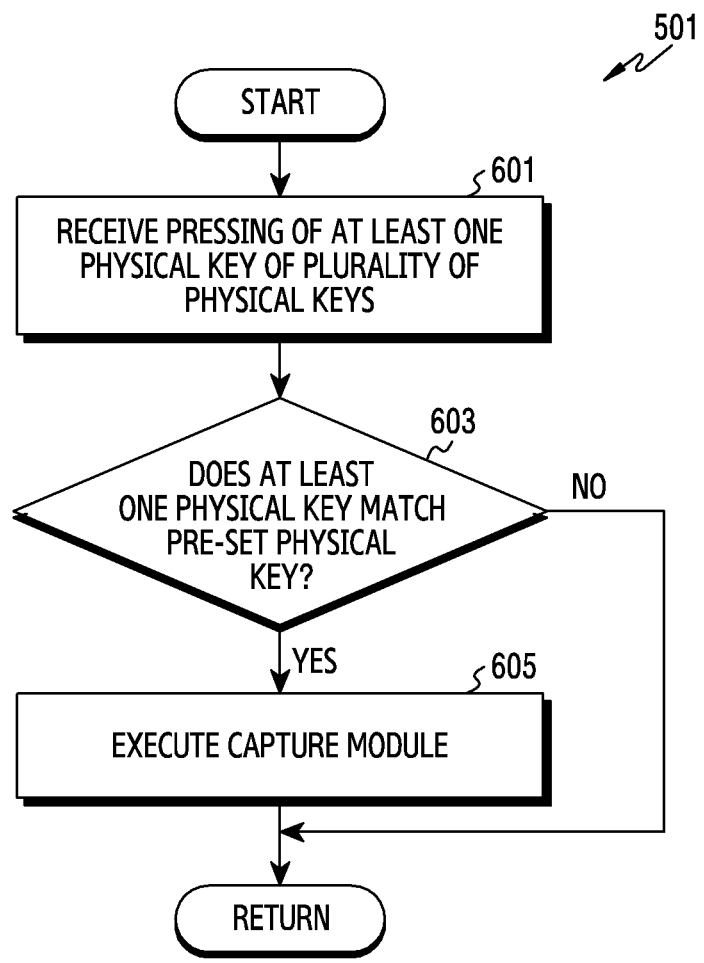
FIG. 6 is a flowchart for executing a capture module according to certain embodiments of the disclosure.

FIG. 6 is a flowchart for executing the capture module according to certain embodiments of the disclosure.

FIG. 6 includes operations of the electronic device 101 for performing operation 501 shown in FIG. 5.

Referring to FIG. 6, in operation 601, the electronic device 101 may detect activation of at least one button key among a plurality of button keys of the electronic device 101 (e.g., a user may press one or more of the device's buttons). The plurality of button keys may be exposed through at least part of the housing.

In operation 603, the processor 120 may determine whether the at least one button key matches a pre-set input (e.g., a button key, or combination of buttons/keys pre-associated with the capture function). When a combination of the at least one button key matches an input for capturing, the processor 120 may perform operation 605.

When the combination of the at least one button key is different from the input for capturing, the processor 120 may bypass executing the capture module 330 and may perform another function corresponding to the at least one button key. For example, when the at least one inputted button key corresponds to a volume down key and a home key, and the input for capturing is the volume down key and a power key, the processor 120 may bypass executing the capture module 220, and may turn down the volume and may switch a screen to a home screen or may perform designated other operations, based on the selected/activated at least one button key.

In operation 605, when the pre-set input matches the capture function, the processor 120 may activate the capture module 330 to execute a capture, including transmitting a control signal activating the capture module 330. The capture module 330 may identify applications presently executing in the foreground and the background of the electronic device 101, and may activate at least one of the image capture module 461, the video recording module 465, the audio recording module 463, or the voice recording module 467, based on the identified application.

Figure 7:
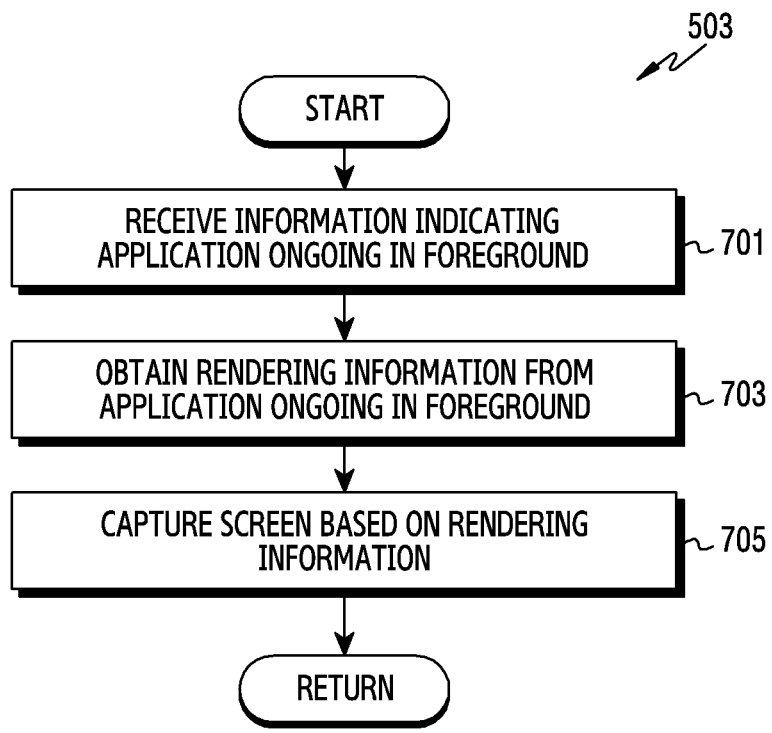
FIG. 7 is a flowchart for capturing a screen according to certain embodiments of the disclosure.

FIG. 7 is a flowchart for capturing a screen according to certain embodiments of the disclosure.

FIG. 7 describes more detailed operations of the electronic device 101 in the execution of operation 503, as shown in FIG. 5.

Referring to FIG. 7, in operation 701, the processor 120 of the electronic device 101 may receive information indicating an application presently executing in the foreground of the electronic device 101. The foreground may indicate a state in which an executing application is displayed through the display device 160, from among a plurality of applications executed by the processor 120, and is operable by the user. The processor 120 may receive scheduling information from the kernel layer 420. The scheduling information may include information regarding an order of processing that is determined based on respective priorities of the plurality of applications processed by the processor 120. The processor 120 may identify an application ongoing in the foreground, based on the received scheduling information.

In operation 703, the processor 120 may obtain rendering information from the application presently executed in the foreground. The processor 120 may request rendering information from the application ongoing in the foreground, based on the scheduling information. The rendering information may include information that the application ongoing in the foreground transmits to a display device driver (not shown) to display a user interface on the display device 160. The application ongoing in the foreground may transmit the rendering information to the processor 120 in response to the request.

In operation 705, the processor 120 may capture an image of the screen based on the obtained rendering information. Capturing the screen may correspond to an operation of generating data including an image displayed through the display device 160. The processor 120 may obtain data including a still image of a user interface, which was displayed at a time when the input associated with capture was received, by using the image capture module 461 included in the capture module 330. The image data of the still image may be generated based on the obtained rendering information.

According to the above-described embodiment, it is depicted that the processor 120 requests the rendering information from the application ongoing in the foreground, but it is understood that the invention is not limited to this embodiment. According to certain embodiments, the processor 120 may request the rendering information from the display device driver (not shown). The display device driver (not shown) may transmit the rendering information to the processor 120 in response to the request. The processor 120 may capture the screen corresponding to the time when the input related to the combination of the plurality of keys is received, by using the image capture module 461 included in the capture module 330, based on the received rendering information.

According to the above-described embodiment, it is illustrated that the processor 120 receives the rendering information from the application ongoing in the foreground or the display device driver (not shown), but this should not be considered as limiting. According to certain embodiments, the processor 120 may receive the image of the still image regarding the user interface of the application ongoing in the foreground, from the application ongoing in the foreground or the display device driver. In this case, the image of the still image may be generated by the application ongoing in the foreground or the display device driver, and may be delivered to the processor 120.

Figure 8:
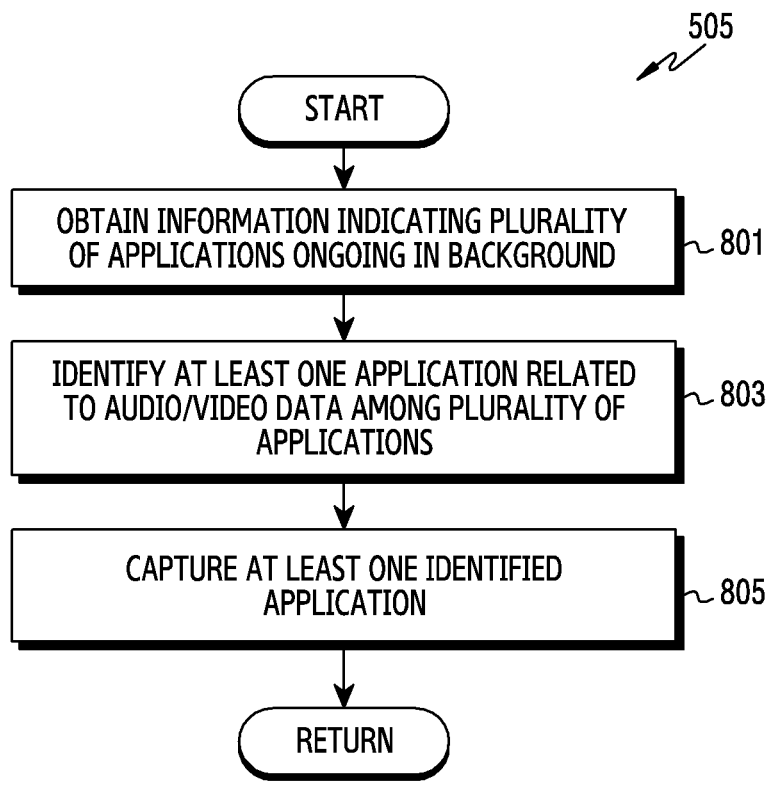
FIG. 8 is a flowchart for capturing an application executed in the background according to certain embodiments of the disclosure.

FIG. 8 is a flowchart for capturing an application executed in the background according to certain embodiments of the disclosure.

FIG. 8 described more details of the operations of the electronic device 101 in the execution of operation 505, as depicted in FIG. 5.

Referring to FIG. 8, in operation 801, the processor 120 of the electronic device 101 may obtain information indicating a plurality of applications presently executed in the background. The background may indicate a state in which applications, though executed, are not displayed through the display device 160 and are therefore not available for operation by the user of the electronic device 101. In response to a user input for capturing being received, the processor 120 may request scheduling information from a scheduler (not shown) of the kernel layer 420. The scheduling information may include information regarding an order of processing that is determined based on respective priorities of the plurality of applications processed by the processor 120.

In operation 803, the processor 120 may identify at least one application related to audio data or video data from among the plurality of applications. The processor 120 may identify applications for processing audio data or video data among the identified plurality of applications. The processor 120 may request information for identifying at least one application related to the audio data or the video data from the library layer 430. The processor 120 may request the information for identifying the at least one application from the audio manager 431 or the media framework 433 included in the library layer 430. The information for identifying the at least one application may include extension information of data to be processed by each of the plurality of applications. The processor 120 may identify at least one application related to audio data or video data among the plurality of applications, based on the extension information of the data to be processed by each of the plurality of applications. For example, when the user of the electronic device 101 surfs the web while listening to music, the application ongoing in the foreground may correspond to a web browser application, and the application ongoing in the background may correspond to a music replay application.

In operation 805, the processor 120 may execute media capture on the at least one identified application. Media capturing may include at least one of capturing an image, capturing a video, capturing an audio, or capturing a voice.

According to an embodiment, the processor 120 may identify that the at least one identified application includes a phone call application or a music replay application. The processor 120 may instruct to capture an audio based on the identified application. The processor 120 may enable the audio recording module 463 included in the capture module 330. For example, the audio recording module 463 may record at least some sections of a call made through the phone call application. In another example, the audio recording module 463 may record at least part of a music file replayed in the music replay application.

According to another embodiment, the processor 120 may identify that the at least one identified application includes a video replay application. The processor 120 may instruct to capture a video based on the identified application. The processor 120 may enable the video recording module 465 included in the capture module 330. For example, the video recording module 465 may record at least some sections of video data provided through the video replay application.

The processor 120 may receive an additional input for capturing while recording the audio or video, although this operation is not illustrated. For example, the user of the electronic device 101 may press at least one button key of the plurality of button keys, and after a predetermined time is elapsed, may press the at least one button key. When the additional input is received while the audio or video is being recorded, the processor 120 may bypass displaying an additional guide interface, and may capture an image. This is because the audio or video is recorded at the time when the additional input is received.

Figure 9A:
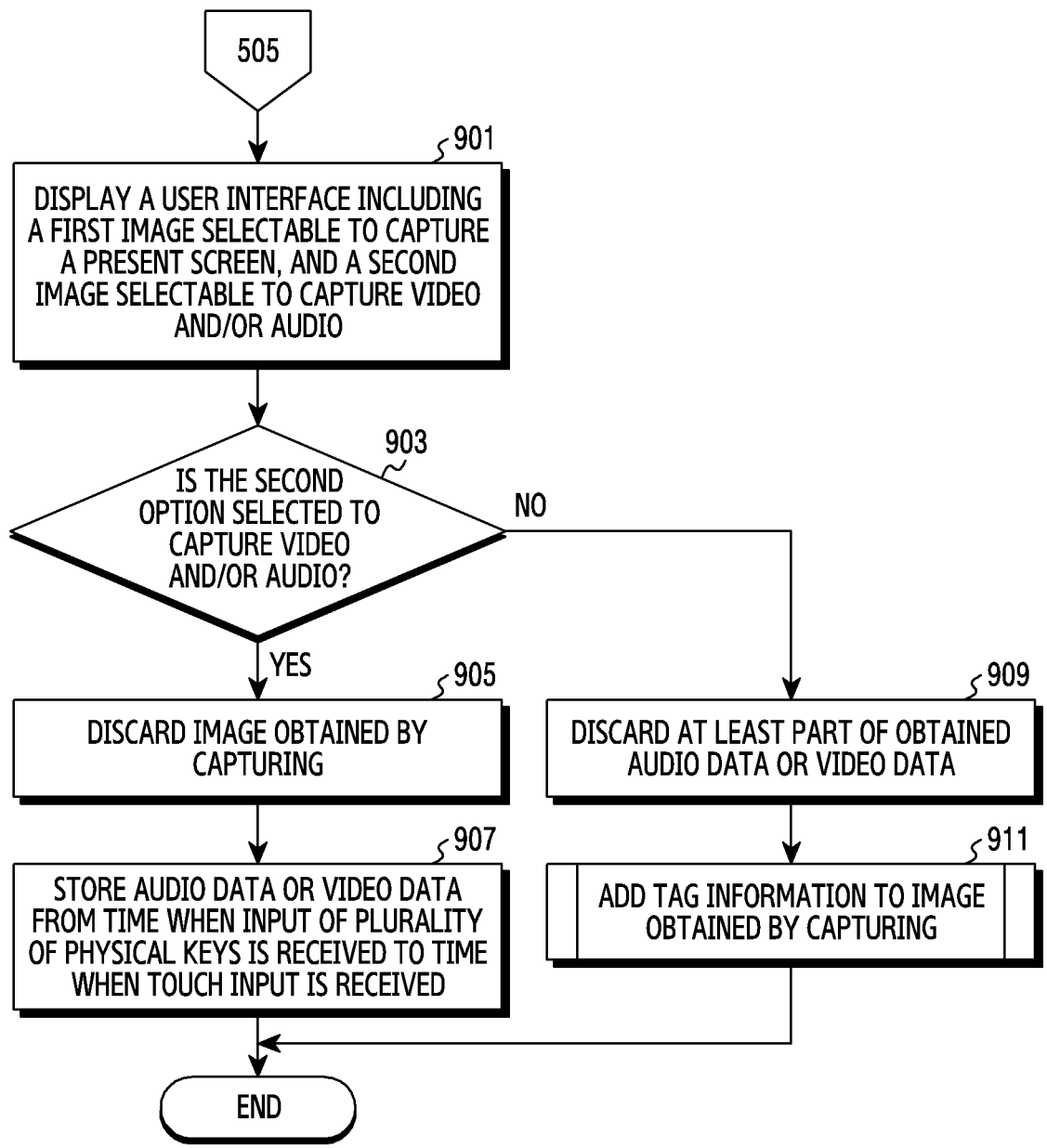
FIG. 9A is a flowchart for selecting a result of capturing according to certain embodiments of the disclosure.

FIG. 9A is a flowchart for selecting a result of capturing according to certain embodiments of the disclosure.

FIG. 9A includes operations of the electronic device 101 after operation 505 shown in FIG. 5.

Referring to FIG. 9A, in operation 901, the processor 120 of the electronic device 101 may display a guide interface providing guidance for generating a user input selecting audio data or video data, or generating a screen-capture. That is, a user interface may be displayed (e.g., overlaid over an executing foreground application), which may include a first selectable option (or a first option) for generating a screen-capture image for a foreground application, and a second selectable option (or a second option) for capturing audio and/or video data for a background application.

Figure 9B:
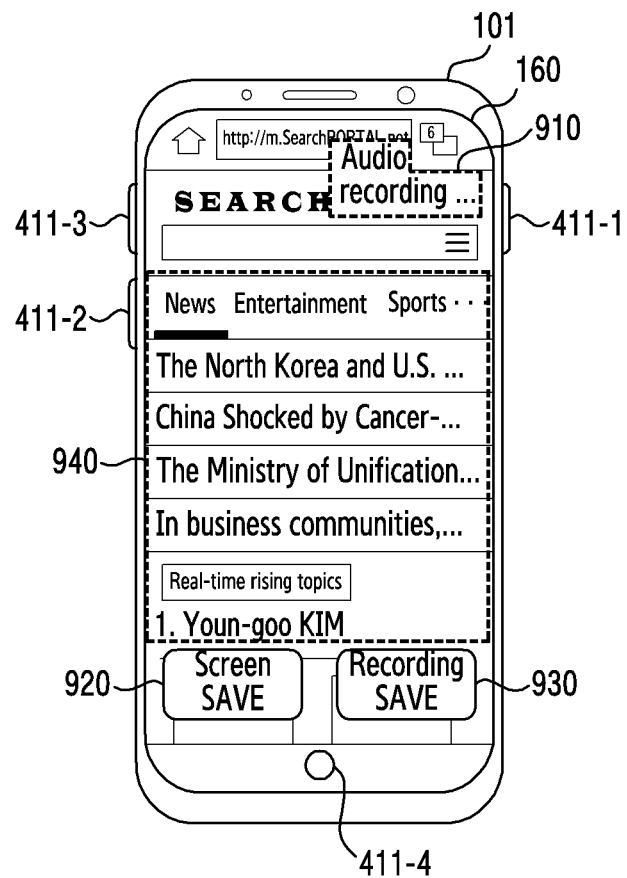
FIG. 9B is a view illustrating an example of a user interface for selecting a result of capturing according to certain embodiments of the disclosure.

Referring to FIG. 9B illustrating the guide interface, the electronic device 101 according to certain embodiments may include a plurality of keys 411-1 to 411-4.

According to an embodiment, the electronic device 101 may execute a web browser application and a music replay application simultaneously. The web browser application may correspond to an application executed in the foreground. The web browser application may output a web page screen 940 through the display device 160. The music replay application may correspond to an application executed in the background. The music replay application may be executed in the background, thereby outputting an audio at the same time as when the web page screen 940 is outputted.

According to certain embodiments, the guide interface may display a guide text 910, an object 920 for selecting screen-capture, and an object 930 for selecting recording of audio data and/or video data. While executing the web browser application, the processor 120 may receive an input indicating a combination of the plurality of keys. For example, the processor 120 may receive simultaneous input of the volume down key 411-2 and the power key 411-1. In an embodiment, the processor 120 may display the guide interface in response to receiving an input indicating the combination of the plurality of keys.

In certain embodiments, the guide interface may be displayed overlapping a user interface of an application ongoing in the foreground. For example, when the application ongoing in the foreground is the web browser application, the web page screen 940 may be displayed through the display device 160. When capturing is performed, the guide interface may be displayed to overlap the web page screen 940. The guide interface may be displayed based on transparency of a constant value to maintain visual recognition of the user of the electronic device 101 regarding the web page screen 940. Referring to FIG. 9B, the web page screen 940 of the web browser application may be displayed under the guide interface.

According to an embodiment, the processor 120 may adjust at least one of transparency on the web page screen 940 or transparency on the guide interface. For example, the processor 120 may adjust the transparency on the guide interface. The processor 120 may adjust the transparency on the guide interface while maintaining the transparency on the web page screen 940, such that the guide interface can be displayed to overlap the web page screen 940 in a translucent state. In another example, the processor 120 may adjust the transparency on the web page screen 940. The processor 120 may adjust the transparency on the web page screen 940 while maintaining the transparency on the guide interface, such that the guide interface is displayed to overlap the web page screen 940.

The guide interface may display the object 920 and the object 930. The objects 920, 930 are selectable to indicate capture still image of the user interface of the application executing in the foreground (e.g., a screen shot), or whether to store audio data and/or video data related to the application executing in the background. To provide guidance to selection of a screen-capture, the object 920 may further display the text "Screen SAVE." Although not shown, other phrases indicating generating of a screen-capture image can include "screen capture," "image file," or "image." To provide guidance for selecting capture of audio data and/or video data related to the application executing in the background, the object 930 may further display the text "Recording SAVE." Although not shown, other may be utilized, such as "multimedia capture," "audio file," "video file," "audio," or "video."

The guide interface may display the guide phrase 910. The guide phrase may correspond to a phrase for guiding any one of the audio data or the video data. For example, when the application ongoing in the background is the music replay application, the processor 120 may generate audio data including at least some sections of a replayed music file. The guide phrase 910 may display the phrase "Audio recording" to guide generating the audio data. In another example, when the application ongoing in the background is a phone call application, the processor 120 may record a call and may generate audio data. The guide phrase 910 may display the phrase "Audio recording" to guide recording the call.

The processor 120 may display the guide interface shown in FIG. 9B, thereby guiding selecting a captured image regarding the application ongoing in the foreground or selecting audio data or video data regarding the application ongoing in the background.

The guide interface of FIG. 9B described above is described on the assumption that one application is executed in the background, but it is understood the disclosure is not limited to this particular embodiment. According to certain embodiments, two or more applications may be related to audio data or video data among the plurality of applications ongoing in the background. For example, the applications executed in the background and related to the audio data or the video data may correspond to the phone call application and the music replay application. The guide interface may display an additional object (not shown) in addition to the objects 920, 930. For example, the object 920 may correspond to an object for guiding an image of the application ongoing in the foreground, and the object 930 may correspond to an object for guiding audio data for recording of the music replay application executed in the background. The additional object (not shown) may correspond to an object for guiding audio data for recording of the phone call application executed in the background. The guide interface may further display as many objects as the number of applications related to audio data or video data among the applications executed in the background.

In operation 903, the processor 120 may determine whether a touch input selects the second option for capturing audio data and/or video data. For example, when the touch input is detected on the object 920, the processor 120 may determine that screen-capture function for a foreground application is selected. In another example, when the touch input is detected on the object 930, the processor 120 may determine that capture of at least part of the audio data or video data for a background application is selected.

In operation 905, the processor 120 may discard the image obtained by capturing a present screen. The processor 120 may identify capture data that the user of the electronic device 101 wishes to store through the touch input inputted through the guide interface. Since the processor 120 detects the touch input of selecting at least part of the audio data or video data through the object 930, the processor 120 may discard the image obtained by capturing the present screen. The processor 120 may transmit a control signal instructing to discard the image obtained by capturing to the memory 130.

In operation 907, the processor 120 may store the audio data and/or video data spanning from a first time when the input of the plurality of physical keys was received to a second time when the touch input is received. The processor 120 may determine an end to capture of the audio data and/or the video data by a time at which the touch input is received. For example, when the application ongoing in the background is a music playback application, the processor 120 may record the audio data processed by the music replay application. The processor 120 may initiate recording of the audio data spanning from a first time at which the input of the combination of the plurality of keys is received, and terminating at a second time when the touch input is received.

According to an embodiment, an end time of the recording may be based on the touch input of the user. For example, when the touch input is detected on the object 930 for storing the audio data or the video data, the processor 120 may end the recording, and may store the audio data processed during a period from the time when the input of the combination of the plurality of physical keys is received to the time when the touch input is received.

According to another embodiment, the end time of the recording may be based on an operation of an application. For example, when the touch input is not received until a replayed sound source ends, the processor 120 may store the audio data with the end of the replayed sound source. The audio data may include audio data which is processed during a period from the time when the input instructing to capture is received to the time that the replayed sound source ends.

In the above-described embodiments, it is illustrated that the processor 120 stores audio data or video data from the time when the input of the plurality of physical keys is received to the time when the touch input on an object (not shown) is detected. However, this should not be considered as limiting. In certain embodiments, the processor 120 may receive the input of the plurality of physical keys and may display the guide interface including the object (not shown). The processor 120 may be configured to store the audio data or the video data from the time when a touch input inputted on the object (not shown) included in the guide interface is detected. In this case, the processor 120 may detect the touch input on the object (not shown), and may change a display of the object (for example, stop, pause). The processor 120 may store the audio data or the video data in the memory 130 until a touch input on the object (not shown) the display of which is changed is detected.

In operation 909, the processor 120 may discard a part of the obtained audio data and/or video data. When the touch input is detected on the first image indicating screen-capture for a foreground application, the processor 120 may discard at least part of any captured audio data and/or video data for the background application. That is, since the audio and/or video data begins recording from detection of the input selecting the correct combination of keys, a user's later selection of the first image indicating screen-capture means the recorded audio and/or video data is no longer necessary. Accordingly, at least a part of it is deleted.

In operation 911, the processor 120 may add tag information to the screen-capture image. The tag information may be extracted based on a type of a content or information to be added. The processor 120 may combine the extracted tag information with the image obtained by capturing the screen, and may store the image. The metadata which may be used in the tagging process is further described below.

In the above-described embodiments, it is illustrated that the tag information is combined with the image and stored, but this should not be considered as limiting. In certain embodiments, the tag information may be combined with the audio data or the video data and may be stored. For example, the tag information may be stored in a metadata area of the audio data or the video data, such that the tag information can be combined with the audio data or the video data.

Figure 10:
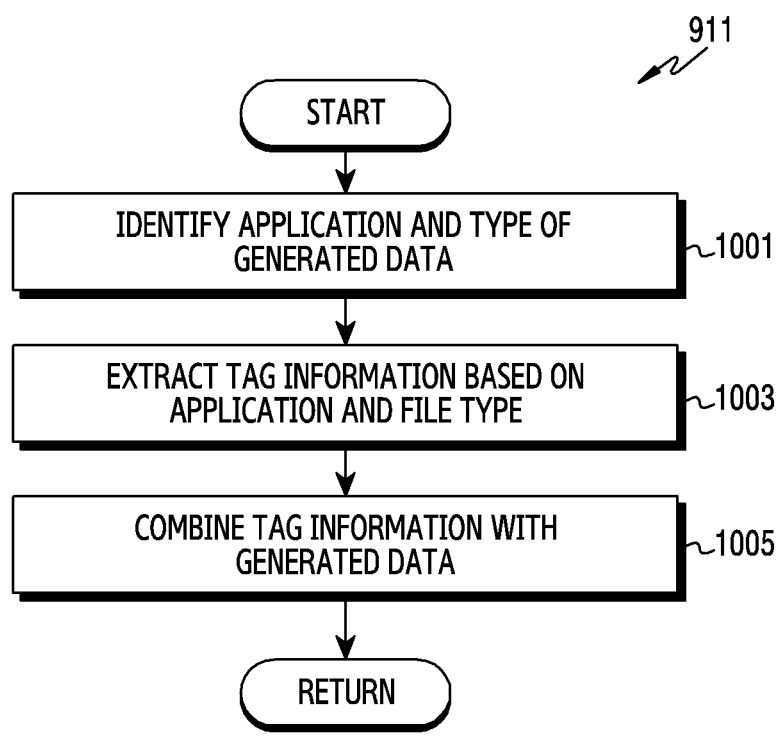
FIG. 10 is a flowchart for adding obtained tag information according to certain embodiments of the disclosure.

FIG. 10 is a flowchart for adding obtained tag information according to various embodiment of the disclosure.

FIG. 10 described in more detail certain operations of the electronic device 101 included in the execution of operation 911, as originally shown in FIG. 9A.

Referring to FIG. 10, in operation 1001, the processor 120 of the electronic device 101 may identify an application and a type of generated data. For example, the processor 120 may obtain information regarding a plurality of applications presently executing, based on scheduling information received from the kernel layer 420. The processor 120 may identify an application executing in the foreground based on the scheduling information. For example, when the identified application corresponds to a web browser, the processor 120 may activate the image capture module and may generate a captured image. The captured image may be generated as a file corresponding to the extension "jpg" or "png."

In operation 1003, the processor 120 may extract tag information based on, for example, the application and the file type. The processor 120 may identify tag information that should be extracted by referring to a table for extracting tag information which is stored in the memory 130. The table for extracting the tag information may correspond to table 1 presented below:

TABLE 1

| Content Type | File Type | Tag Information |
| --- | --- | --- |
| Screen recording | mp4 file | Video title, URL, Recording time |
| Sound recording | mp3, m4a file | Recording time, Recording length, Recoding position, Weather, Date |
| Audio recording | mp3, m3a file | Music title, Album title, Singer name, Song length |
| Call recording | mp3. m4a file | Information on the other person on the phone (phone number, name), recording time, recording length, recording date |
| Image Capturing | jpg, png file | URL, page title, extracted text information, extracted color information, capturing time |

Referring to table 1, when the application is a web browser application, the tag information may include uniform resource locator (URL) information, a title of the URL page, a time or place where the captured image is generated, text information extracted from the captured image, or color information extracted from the captured image. In another example, when the application is a phone call application, the content type may correspond to "Call recording." Accordingly, when the application is the phone call application, the tag information may include information of at least part of information on the other person on the phone (phone number, name), recording time, recording length, or recording date.

In another example, when the application corresponds to a music replay application, a captured audio including at least part of audio data replayed by the music replay application may be generated in the form of a file corresponding to extension of mp3 or m3a. Tag information to be added to the mp3 file or m3a file may include information regarding at least part of a music title, an album title, a singer name, or a length of a sound source.

The processor 120 may identify tag information that should be extracted through the table, and may extract the identified tag information. For example, the processor 120 may identify that the application ongoing in the foreground corresponds to the web browser application, and may extract URL, a page title, extracted text information, extracted color information, or capturing time information with reference to table 1.

In operation 1005, the processor 120 may combine the tag information with generated data. The processor 120 may combine the extracted tag information with generated data. The generated data may include a screen-capture image generated by the image capture module 462, audio data generated by the audio recording module 463, and video data generated by the video recording module 465. For example, the processor 120 may combine the extracted URL, page title, text information, color information, or capturing time information with the captured image. The combined information may be referred to as (again) metadata.

Figure 11A:
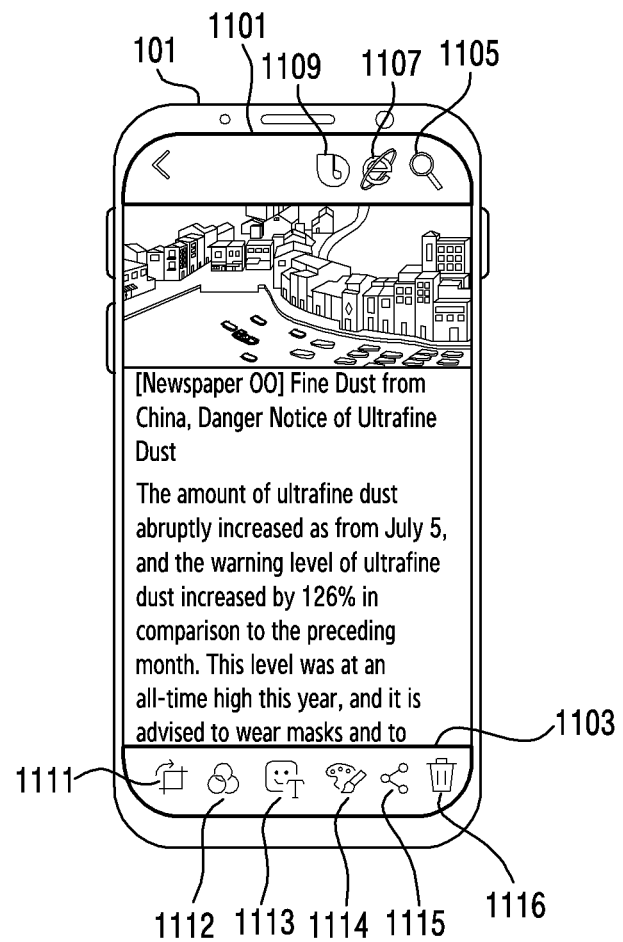
FIG. 11A is a view illustrating an example of a user interface using tag information according to certain embodiments of the disclosure.
Figure 11B:
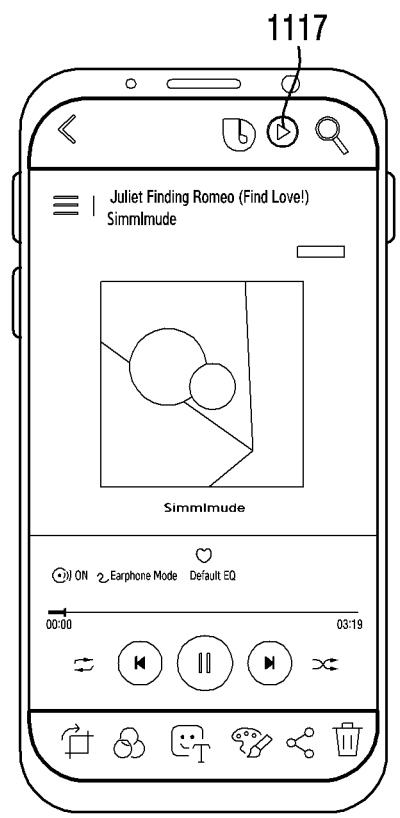
FIG. 11B is a view illustrating another example of a user interface using tag information according to certain embodiments of the disclosure.
Figure 11C:
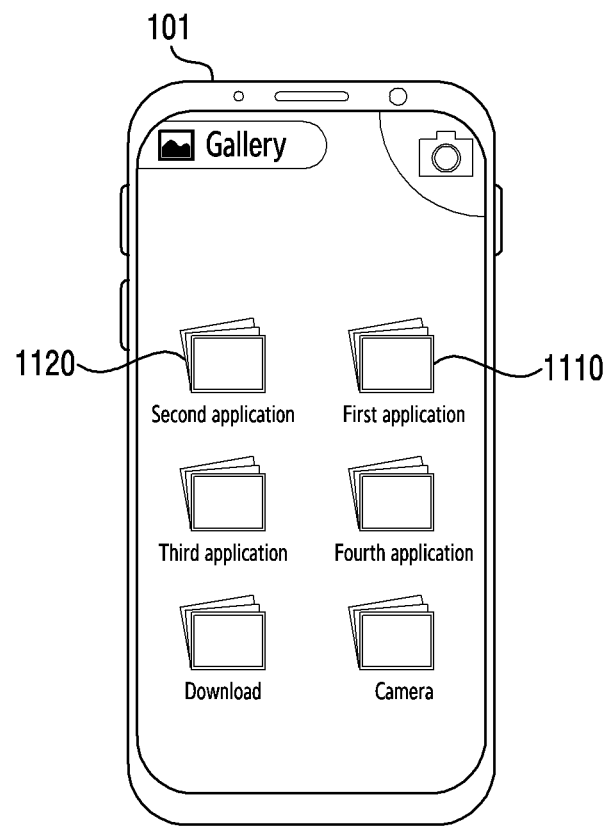
FIG. 11C is a view illustrating still another example of a user interface using tag information according to certain embodiments of the disclosure.

FIG. 11A, FIG. 11B, and FIG. 11C illustrate embodiments in which tag information is used according to certain embodiments of the disclosure.

Referring to FIG. 11A, the electronic device 101 may obtain a captured image. The captured image may include a user interface of an application executed in the foreground of the electronic device 101. For example, the application may include a web browser application. When a user input of a combination of the plurality of physical keys is received while a web content of the web browser application is displayed on the display device 160, the captured image of FIG. 11A may be obtained. When the user touches the captured image, an upper end bar 1101 and a lower end bar 1103 may be displayed. The lower end bar 1103 may include a plurality of graphical objects for performing an edit function of the captured image. The plurality of graphical objects may include a graphical object 1111 to generate a cropped image of the captured image, a graphical object 1112 to perform color calibration, a graphical object 1113 to add a user phrase, a graphical object 1114 to perform drawing input of the user, a graphical object 1115 to share with other users, or a graphical object 1116 to delete the captured image. The upper end bar 1101 may include a search icon 1105, a shortcut icon 1107, or an AI service icon 1109.

According to an embodiment, the user of the electronic device 101 may touch the shortcut icon 1107. The shortcut icon 1107 may be generated based on tag information included in the captured image. For example, the shortcut icon 1107 may be set the same as an icon of the web browser application. When a touch input on the shortcut icon 1107 is received, the processor 120 may execute a corresponding application. When the shortcut icon 1107 of FIG. 11A is touched, the electronic device 101 may execute the web browser application. When the web browser application is executed, the processor 120 may use tag information included in the captured image. For example, the processor 120 may execute the web browser application, and may access an URL by using URL information included in the captured image. Accordingly, the user of the electronic device 101 may access a web page which is a source of the captured image by touching the captured image.

According to certain embodiments, the electronic device 101 may transmit the captured image including the tag information to an external electronic device (for example, the electronic device 102). The external electronic device may utilize the tag information included in the captured image which is received. For example, the external electronic device may execute the captured image. The captured image which is executed may be displayed for the user through the same or similar interface as or to that of FIG. 11A. A user of the external electronic device may touch the shortcut icon 1107. The external electronic device may identify the tag information in response to the touch on the shortcut icon 1107 being identified. When the URL information is included in the tag information, the external electronic device may execute the web browser application and may display the web page of the URL. Accordingly, the tag information included in the captured image may be used not only by the electronic device (for example, the electronic device 101) generating the captured image, but also by all electronic devices (for example, the external electronic device) storing the captured image including the tag information.

According to another embodiment, the user of the electronic device 101 may touch the search icon 1105. The search icon 1105 may display a result of searching related to the captured image. The result of searching may include information which is seared by using the tag information. For example, the processor 120 may extract texts "China," "fine dust," "ultrafine dust," "mask," "going out," or "danger" from the captured image. The processor 120 may provide a web page regarding the result of searching based on a combination of the extracted texts on the web browser application by using the combination of the extracted texts. The processor 120 may provide a result of searching further based on a user input although this operation is not illustrated. For example, the processor 120 may display the extracted texts through the display device 160 in response to the touch input on the search icon 1105 being detected. The user of the electronic device 101 may select at least one of the extracted texts. The processor 120 may provide a result of searching based on the at least one selected text. According to another embodiment, the processor 120 may display a result of searching an image. For example, when the captured image includes a shape of "flower," the processor 120 may search images based on color information included in the captured image, and may display a result of searching a plurality of images regarding flower.

According to still another embodiment, the user of the electronic device 101 may touch the AI service icon 1109. The AI service icon 1109 may provide an AI service based on the tag information included in the captured image.

According to another embodiment, referring to FIG. 11B, the captured image may include a user interface of a music replay application. A shortcut icon 1117 shown in FIG. 11B may be determined based on the music replay application. For example, the shortcut icon 1117 may include an icon shape of the music replay application. The processor 120 may receive a touch input on the shortcut icon 1117. The processor 120 may execute the music replay application in response to the touch input being received. The processor 120 may replay a sound source corresponding to the captured image, by using an album title, a singer name, song title information included in the captured image. For example, when the shortcut icon 1117 is touched, the processor 120 may execute the music replay application, and may replay a sound source sung by the singer "Simmlmude" and titled "Juliet finding Romeo."

FIG. 11C illustrates an example of grouping by using tag information according to certain embodiments of the disclosure. The processor 120 may group based on the tag information. The processor 120 may identify files including the same tag information, based on the grouping, and may store the files in the same position. The same files may include an image file, an audio file, or a video file. For example, referring to FIG. 11C, a plurality of captured images included in a folder 1110 may include captured images related to a first application. A plurality of captured images included in a folder 1120 may include captured images related to a second application. The processor 120 may classify a plurality of captured images into groups based on the tag information. In another example, the folder 1110 may include audio files or video files related to the first application although they are not illustrated. The folder 1120 may include audio files or video files related to the second application. The processor 120 may classify a plurality of audio files or video files according to the first application and the second application. The processor 120 may classify the plurality of audio files or video files into groups based on the tag information. The processor 120 may efficiently manage the plurality of images, the plurality of audio files, or the plurality of video files by using the grouping.

The apparatus and the method according to certain embodiments of the disclosure can obtain various types of multimedia data based on an ongoing application when performing a capturing operation. The apparatus and the method according to certain embodiments of the disclosure can obtain not only an image including a user interface of an application executed in the foreground, but also multimedia data processed by an application executed in the background, by capturing based on an operation state of the electronic device.

According to an embodiment, an electronic device (101) may include: a housing including a first plate facing in a first direction, a second plate facing in a direction opposite to the first plate, and a side surface member surrounding a space between the first plate and the second plate; a display (160) exposed through a first portion of the first plate; a plurality of physical keys (411) arranged on a part of the housing; a processor (120) disposed inside the housing and operatively connected with the display and the plurality of physical keys; and a memory (130) operatively connected with the processor, such that the memory is configured to store an application including a user interface, and when being executed, the memory stores instructions that cause the processor to: receive an input by a combination of the plurality of physical keys; identify an operation state of the electronic device based on reception of the input; when the input by the combination of the plurality of physical keys is received in a first state in which a screen is displayed on the display, perform a first operation related to the displayed screen in response to the input; and when the input by the combination of the plurality of physical keys is received in a second state in which the application processes audio/video (A/V) data, perform a second operation of storing the A/V data in the memory in response to the input.

The instructions may cause the processor to compare the screen displayed on the display and the application, and to provide a user interface for selecting one of the first operation and the second operation on the display.

The user interface for selecting one of the first operation and the second operation may be displayed to be overlaid on the screen displayed through the display.

The user interface for selecting one of the first operation and the second operation may include at least one of a first visual object to receive selection of the first operation, a second visual object to receive selection of the second operation, or a guide phrase indicating that the second operation is performed.

The instructions may cause the processor to receive a user input of selecting the first visual object, and to store a still image which is obtained by capturing the displayed screen in response to the user input being received.

The instructions may cause the processor to delete the A/V data stored in the memory.

The instructions may cause the processor to receive a user input of selecting the second visual object, and to store the A/V data in response to the user input being received.

The instructions may cause the processor to delete a still image obtained by capturing the displayed screen.

The first operation may store a still image obtained by capturing the displayed screen, and the still image may include the user interface.

The operation state may be identified based on at least one of a locking state of the electronic device, or the first state and the second state of the application.

The instructions may cause the processor to, when the electronic device corresponds to the locking state, identify an application operating in the second state in response to the combination of the plurality of physical keys being received, to enable a microphone in response to the application operating in the second state not being identified, and to record a voice by using the enabled microphone.

The second state may correspond to a state in which the application is executed in a background, and the application may correspond to one of a plurality of applications executed in the background.

The screen displayed through the display may correspond to a user interface of an application which is executed in a foreground.

The application executed in the foreground may correspond to an application that is displayed through the display among a plurality of applications processed by the processor and thus is interactable with a user, and the application executed in the background may correspond to other applications except for the application executed in the foreground among the plurality of applications processed by the processor.

The instructions may cause the processor to obtain tag information based on information related to the application.

The instructions may cause the processor to combine the obtained tag information with an image obtained by capturing the displayed screen or the A/V data.

According to an embodiment, an electronic device may include: a housing including a first plate facing in a first direction, a second plate facing in a direction opposite to the first plate, and a side surface member surrounding a space between the first plate and the second plate; at least one memory (130) disposed inside the housing to store instructions; a display (160) exposed through a part of the first plate; and at least one processor (120) disposed inside the housing and operatively connected with the memory and the display, such that, when executing the instructions, the at least one processor is configured to: execute a first application in a foreground and to execute a second application in a background; receive an input for capturing at least part of a user interface (UI) of the first application which is executed in the foreground; and in response to the input being received, obtain at least part of the UI of the first application, and obtain at least part of a multimedia content provided by the second application which is executed in the background.

The input for capturing the at least part of the user interface of the first application may include a combination of at least one physical key and at least one soft key. The combination of the at least one physical key and the at least one soft key is pre-designated. The foreground corresponds to an operation state of an application that is displayed through the display among a plurality of applications processed by the processor and thus is interactable with a user. The background corresponds to an operation state in which other applications except for the application executed in the foreground among the plurality of applications processed by the processor are not displayed through the display. The second application operating in the background corresponds to one of a plurality of applications operating in the background.

The instructions may cause the processor to: display a guide interface for guiding selecting at least part of a UI of the first application or at least part of a multimedia content provided by the second application; in response to a touch input of selecting the at least part of the UI of the first application being received, store the at least part of the UI of the first application as image data; and in response to a touch input of selecting the at least part of the multimedia content provided by the second application being received, store the at least part of the multimedia content provided by the second application as multimedia data.

According to an embodiment, an operating method of an electronic device, the method including: receiving an input by a combination of a plurality of physical keys; identifying an operation state of the electronic device based on reception of the input; when the input by the combination of the plurality of physical keys is received in a first state in which a screen is displayed, performing a first operation related to the displayed screen in response to the input; and when the input by the combination of the plurality of physical keys is received in a second state in which an application processes audio/video (A/V) data, performing a second operation of storing the A/V data in a memory in response to the input.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the disclosure as defined by the appended claims. Therefore, the disclosure is defined not by the detailed description of the disclosure but by the appended claims, and all differences will be construed as being included in the present disclosure.

What is claimed is:

1. An electronic device, comprising:
   a housing including a first plate facing in a first direction, a second plate facing in a direction opposite to the first plate, and a side surface member surrounding a space defined between the first plate and the second plate;
   a display exposed through a first portion of the first plate;
   a plurality of physical keys arranged on the housing;

a processor disposed inside the housing and operatively connected to the display and the plurality of physical keys; and a memory operatively connected with the processor, wherein the memory stores instructions executable by the processor to cause the electronic device to:

receive an input generated by activation of two or more of the plurality of physical keys;

identify an operation state of the electronic device in response to reception of the input;

when the input is received in a first state in which a screen is displayed on the display, execute a first operation related to the displayed screen in response to the received input; and when the input is received in a second state in which an application is processing audio/video (A/V) data, execute a second operation initiating recording of the A/V data using the memory in response to the received input, wherein the second state comprises execution of a plurality of applications as background processes, the plurality of applications comprising the application.

2. The electronic device of claim 1, wherein the instructions are further executable by the processor to cause the electronic device to:

control the display to display a user interface for selecting execution of one of the first operation and the second operation.

3. The electronic device of claim 2, wherein the user interface is overlaid on any content displayed through the display.

4. The electronic device of claim 3, wherein the user interface comprises at least one of:

a first visual object selectable to execute the first operation, a second visual object selectable to execute the second operation, and a text notification indicating execution of the second operation.

5. The electronic device of claim 4, wherein the instructions are further executable by the processor to cause the electronic device to:

detect a selection of the first visual object; and in response to the selection, generating a still image by capturing the displayed screen and storing the generated still image.

6. The electronic device of claim 5, wherein generating the still image further includes deleting the recorded A/V data.

7. The electronic device of claim 4, wherein the instructions are further executable by the processor to cause the electronic device to:

detect a selection of the second visual object; and in response to the selection, store recorded A/V data in the memory.

8. The electronic device of claim 7, wherein the first operation includes capturing a still image of the displayed screen, and wherein storing the recorded A/V data further includes deleting the captured still image.

9. The electronic device of claim 1, wherein the first operation includes generating a still image by capturing the displayed screen, wherein the still image includes a depiction of a user interface.

10. The electronic device of claim 1, wherein the operation state includes at least one of the first state, the second state, and a lock state of the electronic device.

11. The electronic device of claim 10, wherein the instructions are further executable by the processor to cause the electronic device to:

when the electronic device is operating in the locking state, attempt identification of the application operating in the second state in response to the input, and when the application operating in the second state is unidentified, activate a microphone to record sound inputs detected through the microphone.

12. The electronic device of claim 1, wherein the screen displayed through the display includes a user interface of a foreground application executed as a foreground process.

13. The electronic device of claim 12, wherein foreground processes are displayed on the display and are operable by a user, and wherein the background processes are undisplayed on the display and are inoperable by the user.

14. The electronic device of claim 1, wherein the instructions are further executable by the processor to cause the electronic device to:

generate tag information based on information related to the application.

15. The electronic device of claim 14, wherein the instructions are further executable by the processor to cause the electronic device to:

combine the generated tag information with an image obtained by capturing the displayed screen or the A/V data.

16. An electronic device, comprising:

a housing including a first plate facing in a first direction, a second plate facing in a direction opposite to the first plate, and a side surface member surrounding a space between the first plate and the second plate;

at least one memory disposed inside the housing to store instructions;

a display exposed through a part of the first plate; and at least one processor disposed inside the housing and operatively connected with the memory and the display, wherein the memory stores instructions executable by the processor to cause the electronic device to:

execute a first application as a foreground process and to execute a second application as a background process;

receive an input for capturing at least part of a user interface (UI) of the first application; and in response to receiving the input, capture an image of at least part of the UI of the first application, and capture a recording of at least part of a multimedia content provided by the second application executed as the background process.

17. The electronic device of claim 16, wherein the input for capturing the at least part of the user interface of the first application comprises activation of a combination of at least one physical key and at least one soft key, and wherein foreground processes are displayed on the display and are operable by a user, and background processes are undisplayed on the display and are inoperable by the user.

18. The electronic device of claim 16, wherein the instructions are further executable by the processor to cause the electronic device to:

control the display to display the user interface including a first image and a second image selectable by touch input;

in response to detecting selection of the first image, store the captured image of at least part of the UI; and in response to detecting selection of the second image, store the captured recording of at least part of the multimedia content provided by the second application.

19. A method of an electronic device, comprising:
receiving an input generated by activation of two or more of a plurality of physical keys;
identifying an operation state of the electronic device in response to reception of the input;
when the input is received in a first state in which a screen is displayed, executing a first operation related to the displayed screen in response to the received input; and
when the input is received in a second state in which an application is processing audio/video (A/V) data, executing a second operation of initiating recording of the A/V data using a memory in response to the received input,
wherein the second state comprises execution of a plurality of applications as background processes, the plurality of applications comprising the application.

20. The electronic device of claim 1, wherein the application comprises a phone call application, and the recording of the A/V data comprises recording of a phone call to the memory until the phone call is terminated.

* * * * *